US012319807B2

(12) United States Patent
Nishijima et al.

(10) Patent No.: US 12,319,807 B2
(45) Date of Patent: Jun. 3, 2025

(54) RESIN COMPOSITION AND MOLDED PRODUCT

(71) Applicant: DOW-MITSUI POLYCHEMICALS CO., LTD., Tokyo (JP)

(72) Inventors: Koichi Nishijima, Ichihara (JP); Hisao Gonohe, Ichihara (JP); Masataka Aoyama, Tokyo (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 668 days.

(21) Appl. No.: 17/419,491

(22) PCT Filed: Jan. 20, 2020

(86) PCT No.: PCT/JP2020/001685
§ 371 (c)(1),
(2) Date: Jun. 29, 2021

(87) PCT Pub. No.: WO2020/158476
PCT Pub. Date: Aug. 6, 2020

(65) Prior Publication Data
US 2022/0089847 A1   Mar. 24, 2022

(30) Foreign Application Priority Data
Jan. 29, 2019 (JP) ................................. 2019-013411

(51) Int. Cl.
C08K 3/04 (2006.01)
B29C 48/00 (2019.01)
B29C 48/40 (2019.01)
C08L 23/0869 (2025.01)
B29K 23/00 (2006.01)

(52) U.S. Cl.
CPC ........ *C08L 23/0869* (2013.01); *B29C 48/022* (2019.02); *B29C 48/40* (2019.02); *C08K 3/041* (2017.05); *B29K 2023/08* (2013.01); *C08K 2201/003* (2013.01)

(58) Field of Classification Search
CPC ..................................................... C08K 3/041
See application file for complete search history.

(56) References Cited

U.S. PATENT DOCUMENTS

| | | | | |
|---|---|---|---|---|
| 2005/0159540 | A1 | 7/2005 | Goshiki | |
| 2008/0300364 | A1* | 12/2008 | Kuan | C08K 5/5425 525/101 |
| 2012/0027944 | A1* | 2/2012 | Yu | D01D 5/06 427/601 |
| 2015/0018490 | A1 | 1/2015 | Takagiwa et al. | |
| 2015/0267033 | A1* | 9/2015 | Cohen | C08L 77/00 524/456 |
| 2015/0375051 | A1* | 12/2015 | Shiga | C08K 5/09 524/556 |
| 2016/0100768 | A1* | 4/2016 | Someya | A61B 5/24 29/829 |
| 2016/0172944 | A1* | 6/2016 | Murata | G01M 13/00 73/865.8 |
| 2019/0322603 | A1* | 10/2019 | Sundaresan | C06B 45/10 |

FOREIGN PATENT DOCUMENTS

| | | |
|---|---|---|
| CN | 104853816 | 8/2015 |
| CN | 105038201 A | 11/2015 |
| CN | 107099077 | 8/2017 |
| JP | 2004-18660 A | 1/2004 |
| JP | 2004273281 A | 9/2004 |
| JP | 2005-146081 A | 6/2005 |
| JP | 2006-104237 A | 4/2006 |
| JP | 2008-174602 A | 7/2008 |
| JP | 2008-290936 A | 12/2008 |
| JP | 2011-95481 A | 5/2011 |
| JP | 2012-507587 A | 3/2012 |
| JP | 2014-511908 A | 5/2014 |
| JP | 2016-26535 A | 2/2016 |
| JP | 2016-525957 A | 9/2016 |
| JP | 2017082286 A | 5/2017 |
| WO | 2013/133292 A1 | 9/2013 |
| WO | 2014/183101 A1 | 11/2014 |

OTHER PUBLICATIONS

Chinese Office Action (CNOA) dated Oct. 14, 2022 issued in Chinese patent application No. 202080007412.1 and its machine English translation.
Partial supplementary European Search Report dated Aug. 1, 2022 for European Application No. 20748775.2.
International Search Report (ISR) dated Mar. 31, 2020 filed in PCT/JP2020/001685.
Japanese Office Action (JPOA) mailed Jan. 23, 2024 issued in Japanese Patent Application No. 2020-569517 and its English machine translation.
Japanese Office Action (JPOA) dated Sep. 5, 2023 for Japanese Patent Application No. 2020-569517; English Machine Translation.
Hassam C. et al., Dispersion of Single and Multiwalled Nanotubes with Poly (sodiium styrene sulfonate)—Effect of pH and Ionic Strength on Dispersion Stability, Aust. J. Chem., 2014, vol. 67, Issue 1, p. 66-70; Cited in Japanese Office Action mailed on Jul. 30, 2024 issued for Japanese Patent Application No. 2020-569517.

\* cited by examiner

*Primary Examiner* — Margaret G Moore
(74) *Attorney, Agent, or Firm* — RANKIN, HILL & CLARK LLP

(57) ABSTRACT

The present invention provides a resin composition which includes: carbon nanotubes (A); and a resin (B) which is at least one selected from the group consisting of: an ionomer of an ethylene-unsaturated carboxylic acid copolymer (B1); and an ethylene-unsaturated carboxylic acid copolymer (B2).

5 Claims, No Drawings

RESIN COMPOSITION AND MOLDED PRODUCT

TECHNICAL FIELD

The present disclosure relates to a resin composition and a molded product.

BACKGROUND ART

Conventionally, attempts have been performed to add a carbon material to a resin to form a resin composition, and to thereby reduce the volume resistivity of the resin composition (for example, to impart electrical conductivity or antistatic properties to the resin composition).

Among carbon materials, carbon nanotubes have a small tube diameter (also referred to as "fiber diameter") and has a high aspect ratio. It is known that carbon nanotubes therefore are capable of reducing the volume resistivity of resins, even when incorporated at a lower concentration as compared to other carbon materials (such as carbon black, graphite and the like; the same shall apply hereinafter).

However, carbon nanotubes are materials which are more difficult to be dispersed in resins, as compared to other carbon materials.

Accordingly, techniques for improving the dispersibility of carbon nanotubes in resins have been investigated.

For example, Japanese Patent Application Laid-Open (JP-A) No. 2008-290936 discloses a technique which can meet the needs of providing a simple and inexpensive method capable of producing a dispersion in which nanotubes, particularly carbon nanotubes, are dispersed in a polymer material, uniformly, and at a high concentration if necessary, without substantially impairing mechanical and electrical properties of the nanotubes. Specifically, JP-A No. 2008-290936 discloses a method of producing a nanotube-based pre-composite, characterized by bringing nanotubes (such as carbon nanotubes) into contact with a specific plasticizer.

Further, Japanese National-Phase Publication (JP-A) No. 2012-507587 discloses a master batch containing carbon nanotubes (CNT), which satisfies a required viscosity and filling amount, and in which a required electrical conductivity of a polyolefin can thereby be set. Specifically, JP-A No. 2012-507587 discloses a composition Z containing a component A and a component B, wherein the component A is a propylene-olefin-copolymer wax, and the component B is carbon nanotubes. In the composition Z, the propylene-olefin-copolymer wax is produced from propylene monomers, and contains from 0.1 to 50% by weight (% by weight is based on the total weight of the monomer) of at least one olefin containing an alkyl group having from 2 to 18 carbon atoms.

Further, JP-A No. 2014-511908 discloses a technique which enables to eliminate a separate high-temperature mixing step that is required for the formation of a carbon nanotube master batch in a plastic. Specifically, JP-A No. 2014-511908 discloses a method of forming an electrically conductive thermoplastic composition, characterized by including the step of melt blending from about 80 to about 98% by mass of a polymer and from about 2 to about 20% by mass of a carbon nanotube master batch, with respect to the mass of the electrically conductive thermoplastic composition. In this method, the carbon nanotube master batch contains, from about 10 to about 40% by mass of carbon nanotubes, and from about 60 to about 90% by mass of a wax which has a melting point of from about 45 to about 150° C., with respect to the mass of the master batch.

SUMMARY OF INVENTION

Technical Problem

In each of the techniques disclosed in the JP-A No. 2008-290936, JP-A No. 2012-507587 and JP-A No. 2014-511908 described above, a master batch or a pre-composite (hereinafter, sometimes collectively referred to as "master batch or the like") obtained by mixing carbon nanotubes with a plasticizer or a wax is produced first, and the thus produced master batch or the like and a resin are mixed to prepare a resin composition. In this manner, it is thought that an improvement in the dispersibility of the carbon nanotubes in the resin composition is achieved.

However, carbon nanotubes have a higher aspect ratio, specific surface area and amount of oil absorption, as compared to other carbon materials (such as carbon black, graphite and the like). Therefore, in order to produce the master batch or the like described above, a large amount of a plasticizer or a wax is required per unit mass of carbon nanotubes. In a case in which a large amount of a plasticizer or a wax is incorporated into the master batch, there are concerns for the occurrence of bleed-out of the plasticizer or the wax, adverse effects on resin performance (such as the deterioration of mechanical properties) and the like, in the resin composition produced.

The present disclosure has been made in view of the above mentioned problems.

One aspect of the present disclosure provides a resin composition which contains carbon nanotubes, which is excellent in the dispersibility of the carbon nanotubes, and which has a reduced volume resistivity, and a molded product including the same.

Solution to Problem

Specific means for solving the above mentioned problems include the following embodiments.

<1> A resin composition, comprising:
  carbon nanotubes (A); and
  a resin (B), which is at least one selected from the group consisting of an ionomer of an ethylene-unsaturated carboxylic acid copolymer (B1) and an ethylene-unsaturated carboxylic acid copolymer (B2).

<2> The resin composition according to <1>, wherein a content of the carbon nanotubes (A) is from 0.1% by mass to 15% by mass with respect to a total content of the carbon nanotubes (A) and the resin (B).

<3> The resin composition according to <1> or <2>, wherein the total content of the carbon nanotubes (A) and the resin (B) is 50% by mass or more with respect to a total amount of the resin composition.

<4> The resin composition according to any one of <1> to <3>,
  wherein a content of an unsaturated carboxylic acid unit in the ethylene-unsaturated carboxylic acid copolymer (B1) is from 1% by mass to 25% by mass, with respect to a total amount of the ethylene-unsaturated carboxylic acid copolymer (B1), and
  wherein a content of an unsaturated carboxylic acid unit in the ethylene-unsaturated carboxylic acid copolymer (B2) is from 1% by mass to 25% by mass, with respect to a total amount of the ethylene-unsaturated carboxylic acid copolymer (B2).

<5> The resin composition according to any one of <1> to <4>, wherein a content of ethylene unit in the ethylene-unsaturated carboxylic acid copolymer (B1) is from 75% by mass to 99% by mass, with respect to the total amount of the ethylene-unsaturated carboxylic acid copolymer (B1), and wherein a content of ethylene unit in the ethylene-unsaturated carboxylic acid copolymer (B2) is from 75% by mass to 99% by mass, with respect to the total amount of the ethylene-unsaturated carboxylic acid copolymer (B2).

<6> The resin composition according to any one of <1> to <5>, wherein the resin (B) is the ethylene-unsaturated carboxylic acid copolymer (B2).

<7> The resin composition according to any one of <1> to <6>, wherein the resin (B) has a melt flow rate, as measured under conditions of a temperature of 190° C. and a load of 2,160 g, in accordance with JIS K7210-1: 2014 (ISO 1133-1: 2011), of from 0.1 g/10 min to 300 g/10 min.

<8> The resin composition according to any one of <1> to <7>, wherein the carbon nanotubes (A) have an average diameter of from 5 nm to 20 nm, and an average length of from 0.5 μm to 50 μm.

<9> A molded product including the resin composition according to any one of <1> to <8>.

Advantageous Effects of Invention

One aspect of the present disclosure provides a resin composition which contains carbon nanotubes, which is excellent in the dispersibility of the carbon nanotubes, and which has a reduced volume resistivity, and a molded product including the same.

DESCRIPTION OF EMBODIMENTS

In the present disclosure, any numerical range described using the expression "from * to" represents a range in which numerical values described before and after the "to" are included in the range as a lower limit value and an upper limit value, respectively.

In the present specification, the amount of each component in a composition refers, in a case in which a plurality of substances corresponding to each component are present in the composition, to the total amount of the plurality of substances present in the composition, unless otherwise specified.

In a numerical range described in stages, in the present disclosure, the upper limit value or the lower limit value of a certain numerical value may be replaced with the upper limit value or the lower limit value of another numerical range described in stages, or may be replaced with a value shown in Examples.

In the present disclosure, the term "(meth)acrylic acid" is a concept which encompasses both acrylic acid and methacrylic acid, and the term "(meth)acrylic acid ester" is a concept which encompasses both an acrylic acid ester and a methacrylic acid ester.

[Resin Composition]

A resin composition according to the present disclosure contains:

carbon nanotubes (A); and a resin (B) which is at least one selected from the group consisting of: an ionomer of an ethylene-unsaturated carboxylic acid copolymer (B1); and an ethylene-unsaturated carboxylic acid copolymer (B2).

The resin composition according to the present disclosure is excellent in the dispersibility of the carbon nanotubes, and has a reduced volume resistivity.

Reasons why such effects are provided are not clear. However, it is thought that because the resin (B) easily mixes with the carbon nanotubes (A), and allows the diffusion thereof.

One of the indices for confirming the dispersibility of the carbon nanotubes in the resin composition according to the present disclosure, may be, for example, the appearance of strands composed of the resin composition according to the present disclosure (see Examples to be described later).

In general, commercially available carbon nanotubes are provided in the form of a tangled ball of carbon nanotubes, in many cases. In a case in which the carbon nanotubes in the form of a tangled ball are favorably disentangled and dispersed in the resin composition, the resulting strands will have a smooth appearance with less feeling of roughness.

Further, the dispersibility of the carbon nanotubes in the resin composition according to the present disclosure is also reflected on the volume resistivity of the resin composition. A better dispersibility of the carbon nanotubes in the resin composition leads to a lower volume resistivity of the resin composition.

Since the resin composition according to the present disclosure has a reduced volume resistivity, the resin composition is suitable as a resin composition having an electrical conductivity and/or antistatic properties.

The volume resistivity of the resin composition is preferably $1 \times 10^{10}$ Ω·cm or less, more preferably $1 \times 10^9$ Ω·cm or less, and still more preferably $7 \times 10^8$ Ω·cm or less, from the viewpoint of the antistatic properties of the resin composition.

The volume resistivity of the resin composition is preferably $1 \times 10^4$ Ω·cm or less, and more preferably $1 \times 10^3$ Ω·cm or less, from the viewpoint of the electrical conductivity of the resin composition.

From the viewpoint of the electrical conductivity and/or antistatic properties, the lower limit of the volume resistivity of the resin composition is not particularly limited. From the viewpoint of production suitability of the resin composition, the lower limit of the volume resistivity of the resin composition is preferably $1 \times 10^{-1}$ Ω·cm, and more preferably $1 \times 10^0$ Ω·cm.

Further, the resin composition according to the present disclosure also has an advantage that the content of the carbon nanotubes for obtaining a desired volume resistivity can be reduced.

A preferred range of the content of the carbon nanotubes in the resin composition will be described later.

<Carbon Nanotubes (A)>

The resin composition according to the present disclosure contains carbon nanotubes (A).

The resin composition according to the present disclosure may contain only one kind, or two or more kinds of the carbon nanotubes (A).

The carbon nanotubes (A) are cylindrical, hollow fibrous substances each composed of carbon atoms.

The carbon nanotubes (A) may be single-walled carbon nanotubes and/or multi-walled carbon nanotubes. The carbon nanotubes (A) are preferably multi-walled carbon nanotubes, from the viewpoint of achieving a favorable dispersion.

The carbon nanotubes (A) preferably have an average diameter of from 5 nm to 20 nm.

When the carbon nanotubes have an average diameter of from 5 nm or more, the carbon nanotubes are less susceptible to being cut, during kneading.

When the carbon nanotubes have an average diameter of 20 nm or less, the effect of reducing the volume resistivity of the resin composition is further improved.

The average diameter of the carbon nanotubes is more preferably from 6 nm to 20 nm, and still more preferably from 7 nm to 20 nm.

The carbon nanotubes (A) preferably have an average length of from 0.5 μm to 50 μm.

When the carbon nanotubes (A) have an average length of 0.5 μm or more, the effect of reducing the volume resistivity of the resin composition is further improved.

When the carbon nanotubes (A) have an average length of 50 μm or less, an increase in the viscosity during kneading can further be reduced, making it easier to perform the kneading and molding.

The average length of the carbon nanotubes (A) is more preferably from 0.5 μm to 30 μm, and still more preferably from 0.6 μm to 15 μm.

It is preferred that the carbon nanotubes (A) have an average diameter of from 5 nm to 20 nm, and an average length of from 0.5 μm to 50 μm. In this embodiment, a more preferred range of each of the average diameter and the average length is as described above.

The average diameter of the carbon nanotubes (A) described above is a value determined by observing the carbon nanotubes (A) using an electron microscope (scanning electron microscopy (SEM) or a transmission electron microscope (TEM)), and measuring the diameters of 50 carbon nanotubes, and by calculating the arithmetic mean of the measured diameters.

The average length of the carbon nanotubes (A) described above is a value determined by observing the carbon nanotubes (A) using an electron microscope (scanning electron microscopy (SEM) or a transmission electron microscope (TEM)), and measuring the lengths of 50 carbon nanotubes, and by calculating the arithmetic mean of the measured lengths.

The carbon nanotubes (A) can be produced by an arc discharge method, a chemical vapor deposition method (CVD method), a laser ablation method or the like.

Further, a commercially available product of carbon nanotubes may be used as the carbon nanotubes (A), which is "component (A)". Examples of the commercially available product of carbon nanotubes which can be used include: FLO TUBE 9000, manufactured by C-Nano Technology Ltd.; C-100, manufactured by Arkema SA; NC7000, manufactured by Nanocyl SA; and NC7000, manufactured by Nanocyl SA.

These commercially available products satisfy the ranges of the average diameter and the average length described above, and can be preferably used. In addition, theses commercially available products are excellent also from the viewpoint that the products are mass produced and are competitive in terms of price.

The content of the carbon nanotubes (A) is preferably from 0.1% by mass to 15% by mass, and more preferably from 0.1% by mass to 10% by mass, with respect to the total content of the carbon nanotubes (A) and the resin (B).

When the content of the carbon nanotubes (A) with respect to the total content of the carbon nanotubes (A) and the resin (B) is 0.1% by mass or more, the effect of reducing the volume resistivity of the resin composition is further improved.

When the content of the carbon nanotubes (A) with respect to the total content of the carbon nanotubes (A) and the resin (B) is 15% by mass or less, and preferably 10% by mass or less, the performance of the resin (B) can be more effectively maintained.

The content of the carbon nanotubes (A) with respect to the total content of the carbon nanotubes (A) and the resin (B) is more preferably from 0.2% by mass to 5% by mass, still more preferably from 0.5% by mass to 3% by mass, yet still more preferably from 0.5% by mass to 2% by mass.

Further, the content of the carbon nanotubes (A) is preferably from 0.1% by mass to 15% by mass, and more preferably from 0.1% by mass to 10% by mass, with respect to the total amount of the resin composition.

When the content of the carbon nanotubes (A) with respect to the total amount of the resin composition is 0.1% by mass or more, the effect of reducing the volume resistivity of the resin composition is further improved.

When the content of the carbon nanotubes (A) with respect to the total amount of the resin composition is 15% by mass or less, and preferably 10% by mass or less, the performance of the resin (B) can be more effectively maintained.

The content of the carbon nanotubes (A) with respect to the total amount of the resin composition is more preferably from 0.2% by mass to 5% by mass, still more preferably from 0.5% by mass to 3% by mass, and still more preferably from 0.5% by mass to 2% by mass.

<Resin (B)>

The resin composition according to the present disclosure contains a resin (B) which is at least one selected from the group consisting of: an ionomer of an ethylene-unsaturated carboxylic acid copolymer (B1); and an ethylene-unsaturated carboxylic acid copolymer (B2). The resin (B) is preferably the ethylene-unsaturated carboxylic acid copolymer (B2), from the viewpoint of reducing the volume resistivity of the resin composition.

The resin composition according to the present disclosure may contain only one kind, or two or more kinds of the resins (B).

(Ionomer of Ethylene-Unsaturated Carboxylic Acid Copolymer (B1))

The ionomer of the ethylene-unsaturated carboxylic acid copolymer (B1) is a compound in which at least some of the carboxy groups in the ethylene-unsaturated carboxylic acid copolymer (B1) as a base polymer are neutralized with a metal ion.

The ethylene-unsaturated carboxylic acid copolymer (B1) as the base polymer, is a copolymer which is obtained by copolymerizing at least ethylene and an unsaturated carboxylic acid, and which contains an ethylene unit (namely, a structural unit derived from ethylene), and an unsaturated carboxylic acid unit (namely, a structural unit derived from an unsaturated carboxylic acid).

The ethylene-unsaturated carboxylic acid copolymer (B1) may be any one of a block copolymer, a random copolymer and a graft copolymer.

The ethylene-unsaturated carboxylic acid copolymer (B1) is preferably a random copolymer, from the viewpoint of industrial availability.

Examples of the unsaturated carboxylic acid unit include (meth)acrylic acid unit, fumaric acid unit, and maleic acid unit.

Among these, the unsaturated carboxylic acid unit is preferably (meth)acrylic acid unit, and still more preferably methacrylic acid unit.

The content of the unsaturated carboxylic acid unit in the ethylene-unsaturated carboxylic acid copolymer (B1) as the base polymer is preferably from 1% by mass to 25% by mass, more preferably from 3% by mass to 20% by mass, and still more preferably from 5% by mass to 15% by mass, with respect to the total amount of the ethylene-unsaturated carboxylic acid copolymer (B1).

The content of the ethylene unit in the ethylene-unsaturated carboxylic acid copolymer (B1) as the base polymer is preferably from 75% by mass to 99% by mass, more preferably from 80% by mass to 97% by mass, and still more preferably from 85% by mass to 95% by mass, with respect to the total amount of the ethylene-unsaturated carboxylic acid copolymer (B1).

The ethylene-unsaturated carboxylic acid copolymer (B1) as the base polymer may, but need not, contain another structural unit other than the ethylene unit and the unsaturated carboxylic acid unit.

The total content of the ethylene unit and the unsaturated carboxylic acid unit in the ethylene-unsaturated carboxylic acid copolymer (B1) as the base polymer is preferably from 70% by mass or more, more preferably from 80% by mass or more, and still more preferably from 90% by mass or more, with respect to the total amount of the ethylene-unsaturated carboxylic acid copolymer (B1). The upper limit value of the total content of the ethylene unit and the unsaturated carboxylic acid unit is not particularly limited, and is, for example, 100% by mass.

Examples of other structural units which may be contained in the ethylene-unsaturated carboxylic acid copolymer (B1) as the base polymer include an unsaturated carboxylic acid ester unit.

A monomer for forming the unsaturated carboxylic acid ester unit is preferably a (meth)acrylic acid ester, more preferably a (meth)acrylic acid alkyl ester, and still more preferably a (meth)acrylic acid alkyl ester whose alkyl ester portion (namely, alkoxy group) has from 1 to 10 carbon atoms.

The alkyl ester portion (namely, alkoxy group) in the monomer for forming the unsaturated carboxylic acid ester unit more preferably has from 1 to 8 carbon atoms, still more preferably from 1 to 6 carbon atoms, yet still more preferably from 1 to 4 carbon atoms, and yet still more preferably 1 or 2 carbon atoms.

Examples of the monomer for forming the unsaturated carboxylic acid ester unit include methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, isohexyl (meth)acrylate, n-octyl (meth)acrylate, isooctyl (meth)acrylate, and (meth) acrylic acid-2-ethylhexyl.

In the ionomer of the ethylene-unsaturated carboxylic acid copolymer (B1), the type of the metal ion for neutralizing the carboxy groups in the ethylene-unsaturated carboxylic acid copolymer (B1) (base polymer) is not particularly limited.

Examples of the metal ion include:
alkali metal ions such as lithium ion, sodium ion, potassium ion, rubidium ion and cesium ion;
alkaline earth metal ions such as magnesium ion and calcium ion;
transition metal ions such as zinc ion; and
various types of metal ions such as aluminum ion.

The metal ion is preferably at least one selected from the group consisting of zinc (Zn) ion, magnesium (Mg) ion and sodium (Na) ion, and more preferably at least one selected from the group consisting of zinc ion and sodium ion, and still more preferably zinc ion.

Only one kind or two or more kinds of the metal ions may be used for neutralizing the carboxy groups in the base polymer may be neutralization.

The ionomer of the ethylene-unsaturated carboxylic acid copolymer (B1) preferably has a degree of neutralization of 90% or less, more preferably from 5% to 80%, and still more preferably from 10% to 70%.

When the degree of neutralization is 90% or less, ion aggregation can be reduced to a moderate level, a decrease in flowability can be further reduced, and molding processability can be more suitably maintained.

When the degree of neutralization is 5% or more, the performance as the ionomer can be more effectively exhibited.

The term "the degree of neutralization (%)" as used herein refers to the ratio (% by mole) of the carboxy groups which have been neutralized by the metal ion, of all the carboxy groups contained in the ethylene-unsaturated carboxylic acid copolymer (B1) (base polymer).

The ethylene-unsaturated carboxylic acid copolymer (B1) preferably has a melt flow rate (hereinafter, also simply referred to as "MFR (at 190° C. and at a load of 2,160 g)"), as measured under the conditions of a temperature of 190° C. and a load of 2,160 g, in accordance with JIS K7210-1: 2014 (ISO 1133-1: 2011), of from 0.1 g/10 min to 300 g/10 min, more preferably from 1 g/10 min to 100 g/10 min, and still more preferably from 5 g/10 min to 60 g/10 min.

(Ethylene-Unsaturated Carboxylic Acid Copolymer (B2))

The ethylene-unsaturated carboxylic acid copolymer (B2) may be, for example, the same as that described for the ethylene-unsaturated carboxylic acid copolymer (B1) (base polymer) described above, and preferred embodiments of the ethylene-unsaturated carboxylic acid copolymer (B2) are also the same as the preferred embodiments of the ethylene-unsaturated carboxylic acid copolymer (B1).

The resin (B) preferably has a melt flow rate (hereinafter, also simply referred to as "MFR (at 190° C. and at a load of 2,160 g)"), as measured under the conditions of a temperature of 190° C. and a load of 2,160 g, in accordance with JIS K7210-1: 2014 (ISO 1133-1: 2011), of from 0.1 g/10 min to 300 g/10 min, more preferably from 1 g/10 min to 100 g/10 min, and still more preferably from 5 g/10 min to 60 g/10 min.

The content of the resin (B) is preferably from 85% by mass to 99.9% by mass, and more preferably from 90% by mass to 99.9% by mass, with respect to the total content of the carbon nanotubes (A) and the resin (B).

When the content of the resin (B) with respect to the total content of the carbon nanotubes (A) and the resin (B) is 99.9% by mass or less, the volume resistivity of the resin composition is further reduced.

When the content of the resin (B) with respect to the total content of the carbon nanotubes (A) and the resin (B) is 85% by mass or more, and preferably 90% by mass or more, the performance of the resin (B) can be more effectively maintained in the resin composition.

The content of the resin (B) with respect to the total content of the carbon nanotubes (A) and the resin (B) is more preferably from 95% by mass to 99.8% by mass, still more preferably from 97% by mass to 99.5% by mass, and yet still more preferably from 98% by mass to 99.5% by mass.

Further, the content of the resin (B) is preferably from 85% by mass to 99.9% by mass, and more preferably from 90% by mass to 99.9% by mass, with respect to the total amount of the resin composition.

When the content of the resin (B) with respect to the total amount of the resin composition is 99.9% by mass or less, the volume resistivity of the resin composition is further reduced.

When the content of the resin (B) with respect to the total amount of the resin composition is 85% by mass or more, and preferably 90% by mass or more, the performance of the resin (B) can be more effectively maintained in the resin composition.

The content of the resin (B) with respect to the total amount of the resin composition is more preferably from 95% by mass to 99.8% by mass, still more preferably from 97% by mass to 99.5% by mass, and yet still more preferably from 98% by mass to 99.5% by mass.

<Other Components>

The resin composition according to the present disclosure may, but need not, contain another component or components other than the carbon nanotubes (A) and the resin (B), if necessary.

However, from the viewpoint of more effectively obtaining the effects of the resin composition according to the present disclosure, the total content of the carbon nanotubes (A) and the resin (B) is preferably 50% by mass or more, more preferably 60% by mass or more, still more preferably 80% by mass or more, and particularly preferably 85% by mass or more, with respect to the total amount of the resin composition. The upper limit value of the total content of the carbon nanotubes (A) and the resin (B) with respect to the total amount of the resin composition is not particularly limited, and is, for example, 100% by mass.

Examples of other components which can be contained in the resin composition according to the present disclosure include:

other resins other than the resin (B); and additives for resins, such as antioxidants, anti-aging agents, photostabilizers, thermal stabilizers, ultraviolet absorbers, antiblocking agents, pressure sensitive adhesives, inorganic fillers, organic fillers, pigments, dyes, flame retardants, auxiliary flame retardants, foaming agents and foaming aids.

Further, examples of other components which can be contained in the resin composition according to the present disclosure also include plasticizers and waxes, such as those described in JP-A No. 2008-290936, JP-A No. 2012-507587 and JP-A No. 2014-511908 described above.

In the resin composition according to the present disclosure, however, a favorable dispersibility of the carbon nanotubes (A) can be obtained due to the effect of the resin (B) itself, and therefore, an embodiment in which no plasticizer nor wax is incorporated is also possible. In addition, in the case of incorporating a plasticizer and/or a wax, as well, the content(s) of the plasticizer and/or the wax can be reduced, in the resin composition according to the present disclosure. Therefore, even in a case in which the resin composition according to the present disclosure contains a plasticizer and/or a wax, the bleed-out of the plasticizer or the wax, the deterioration of the resin performance (such as mechanical properties) and the like are reduced.

The resin composition according to the present disclosure can be obtained, for example, by a method in which the carbon nanotubes (A) and the resin (B), and another component(s), if necessary, are melt-kneaded using a single-screw extruder, a twin-screw extruder, a mixer, a kneader or the like.

The resin composition according to the present disclosure is suitable as a raw material of a molded product to be described later.

[Molded Product]

A molded product according to the present disclosure contains the resin composition according to the present disclosure.

The molded product according to the present disclosure may be one consisting of the resin composition according to the present disclosure, or may be one composed of the resin composition according to the present disclosure and another component(s).

Further, the molded product according to the present disclosure may be a part or a whole of a member.

The molded product according to the present disclosure is produced, for example, by mixing the resin composition according to the present disclosure as a raw material, with another component(s), if necessary, and then molding the mixture by a known molding method (such as press molding, extrusion molding, injection molding, film forming, calendar molding or spinning).

Alternatively, the molded product may be produced by using the resin composition according to the present disclosure as a master batch, mixing the master batch and a resin(s) (such as the resin (B), a thermoplastic resin other than the resin (B) and/or the like) to obtain a composition, and using the composition to form the molded product.

[Applications of Resin Composition and Molded Product]

The resin composition and the molded product according to the present disclosure described above can be used in any of the applications in which antistatic properties and/or electrical conductivity are required.

The resin composition and the molded product according to the present disclosure can be used, in for example, in: packaging materials; containers such as trays; building or civil engineering materials (such as ceiling materials, wall materials and flooring materials); automotive parts; parts for vehicles other than automobiles; office automation equipment; electric and electronic components, parts for consumer electronics, or storage cases thereof; electromagnetic wave shielding layers; trays for transporting semiconductor products or semiconductor semi-finished products; packaging materials for packaging semiconductor products or semiconductor semi-finished products; stationaries; various types of films; sports goods (such as golf balls); and other daily necessities.

EXAMPLES

Examples of the present disclosure will now be described, but the present disclosure is in no way limited to the following Examples. Hereinafter, the carbon nanotubes (A) may sometimes be referred to as "component (A)", and the resin (B) may sometimes be referred to as "component (B)".

Details of the respective components used in the Examples and the Comparative Examples are as follows.

In the following description, the MFR (at 190° C. and at a load of 2,160 g) refers to a melt flow rate as measured under the conditions of a temperature of 190° C. and a load of 2,160 g, in accordance with JIS K7210-1: 2014 (ISO 1133-1: 2011), and the MFR (at 230° C. and at a load of 2,160 g) refers to a melt flow rate as measured under the conditions of a temperature of 230° C. and a load of 2,160 g, in accordance with JIS K7210-1: 2014 (ISO 1133-1: 2011).

[Component (A): Carbon Nanotubes (A)]
CNT1: "NC7000" (average diameter: 9.5 nm, average length: 1.5 μm); manufactured by Nanocyl SA

[Component (B): Resin (B) which is at Least One Selected from Group Consisting of: Ionomer of Ethylene-Unsaturated Carboxylic Acid Copolymer (B1); and Ethylene-Unsaturated Carboxylic Acid Copolymer (B2)]

EMAA1: an ethylene-methacrylic acid copolymer (ethylene content=92% by mass, methacrylic acid content (shown as "acid content" in Table 1; the same shall apply hereinafter)=8% by mass, MFR (at 190° C. and at a load of 2,160 g)=23 g/10 min)

EMAA2: an ethylene-methacrylic acid copolymer (ethylene content=90% by mass, methacrylic acid content=10% by mass, MFR (at 190° C. and at a load of 2,160 g)=35 g/10 min)

EMAA3: an ethylene-methacrylic acid copolymer (ethylene content=85% by mass, methacrylic acid content=15% by mass, MFR (at 190° C. and at a load of 2,160 g)=25 g/10 min)

Ionomer 1: a zinc ionomer (degree of neutralization=21%, MFR (at 190° C. and at a load of 2,160 g)=16 g/10 min) of an ethylene-methacrylic acid copolymer (ethylene content=85% by mass, methacrylic acid content=15% by mass)

[Resin for Comparison]
PE1: "HI-ZEX 1300J" (polyethylene, density=960 kg/m$^3$, MFR (at 190° C. and at a load of 2,160 g)=13 g/10 min); manufactured by Prime Polymer Co., Ltd.

PP1: "F317 DV" (polypropylene, density=900 kg/m$^3$, MFR (at 230° C. and at a load of 2,160 g)=3 g/10 min); manufactured by Prime Polymer Co., Ltd.

EXAMPLES 1 TO 16, COMPARATIVE EXAMPLES 1 TO 8

<Production of Resin Compositions (Example 4, Example 8, Example 12 and Example 16)>

In each of the Examples, the component (A) and the corresponding component (B) shown in Table 1 or Table 2 were introduced into an FM mixer (FM10C/I, capacity: 9 dm$^3$) manufactured by Nippon Coke & Industry Co., Ltd., at the mixing ratio shown in Table 1 or Table 2, and stirred and mixed under the conditions of a stirring temperature of 140° C., a stirring time of 60 minutes and a rotational speed of 1,000 rpm to obtain a mixture.

Subsequently, using a twin-screw extruder (TEM-35B [screw diameter: 35 mm, L/D: 32, vent type] manufactured by Toshiba Machine Co., Ltd.) in which a die with holes for extruding strands having a diameter of 3 mm was attached to the outlet of the extruder, each resulting mixture was melt-kneaded under the conditions of a stirring rotational speed of 100 rpm and a temperature of 220° C. In this manner, melt-kneaded products (namely, resin compositions each composed of 5% by mass of the component (A) and 95% by mass of the component (B)) were obtained.

Each resulting melt-kneaded product was extruded through the die into water, and cooled in water to obtain strands. The resulting strands were cut with a strand cutter to obtain pellets of each Example.

It is noted here, that the melt-kneaded product, the strands and the pellets are each one embodiment of each resin composition.

<Production of Resin Compositions (Examples 1 to 3, Examples 5 to 7, Examples 9 to 11, and Examples 13 to 15)>

In each of the Examples, the pellets obtained in Example 4, Example 8, Example 12 or Example 16, and the corresponding component (B) were introduced into the twin-screw extruder so that the mixing ratio of the component (A) and the component (B) was adjusted to that shown in Table 1 or Table 2. The resultant was melt-kneaded under the conditions of a stirring rotational speed of 100 rpm and a temperature of 220° C., to dilute the resin composition constituting the pellets of each Example with the component (B). In this manner, melt-kneaded products (resin compositions) each having the mixing ratio of the component (A) and the component (B) shown in Table 1 or Table 2 were obtained.

Each resulting melt-kneaded product was used to produce strands in the same manner as in Example 4, and the thus obtained strands were cut with a strand cutter to obtain pellets of each Example.

<Production of Resin Compositions (Comparative Example 4 and Comparative Example 8)>

The same operation as in Example 4 was repeated, except that the component (B) was changed to the corresponding resin for comparison shown in Table 2, to obtain melt-kneaded products (namely, resin compositions each composed of 5% by mass of the component (A) and 95% by mass of the resin for comparison).

Each resulting melt-kneaded product was used to produce strands in the same manner as in Example 4, and the thus obtained strands were cut with a strand cutter to obtain pellets of each Comparative Example.

<Production of Resin Compositions (Comparative Examples 1 to 3 and Comparative Examples 5 to 7)>

In each of the Comparative Examples, the pellets obtained in Comparative Example 4 or Comparative Example 8 and the corresponding resin for comparison were introduced into the twin-screw extruder so that the mixing ratio of the component (A) and the resin for comparison was adjusted to that shown in Table 2. The resultant was melt-kneaded under the conditions of a stirring rotational speed of 100 rpm and a temperature of 220° C., to dilute the resin composition constituting the pellets of each Comparative Example with the resin for comparison. In this manner, melt-kneaded products (resin compositions) each having the mixing ratio of the component (A) and the resin for comparison shown in Table 2 were obtained.

Each resulting melt-kneaded product was used to produce strands in the same manner as in Example 4, and the thus obtained strands were cut with a strand cutter to obtain pellets of each Comparative Example.

<Evaluations>

The following evaluations were carried out using the strands and the pellets of each of the Examples and Comparative Examples. The results are shown in Table 1 and Table 2.

(Appearance of Strands (Dispersibility the Component (A))

As one of the indices for evaluating the dispersibility of the component (A), the appearance of the strands described above was examined by visual observation and the feeling of touch, and evaluated in accordance with the following evaluation criteria.

In the following evaluation criteria, the highest rating in the evaluation of the dispersibility of the component (A) is A. In other words, when the component (A) (carbon nanotubes) is favorably disentangled and dispersed in the strands, the strands are evaluated as A.

—Evaluation Criteria for Appearance of Strands—
A: the strands had a smooth appearance, without feeling of roughness.
B: the strands had a slight feeling of roughness.
C: the strands had an obvious feeling of roughness.

(Volume Resistivity)

Using a press molding machine, the pellets described above were press-molded at a temperature of 220° C., to prepare a molded product in the form of a sheet having a thickness of 1 mm.

The volume resistivity of the thus obtained sheet-like molded product was measured, using a resistivity meter (Loresta GPMCP-T610, manufactured by Mitsubishi Chemical Analytech Co., Ltd.).

The dispersibility of the component (A) is related to the volume resistivity, as well. In other words, the volume resistivity will be reduced when the component (A) (carbon nanotubes) is favorably disentangled and dispersed in the sheet-like molded product.

(MFR)

Using the pellets described above, the MFR (melt flow rate) of the resin composition constituting the pellets was measured.

The MFR was measured using a melt indexer (manufactured by Toyo Seiki Co., Ltd.), under the conditions of a temperature of 190° C. and a load of 2,160 g, in accordance with JIS K7210-1: 2014 (ISO 1133-1: 2011)

TABLE 1

|  |  | Example 1 | Example 2 | Example 3 | Example 4 | Example 5 | Example 5 | Example 7 | Example 8 | Example 9 | Example 10 | Example 11 | Example 12 |
|---|---|---|---|---|---|---|---|---|---|---|---|---|---|
| Component (B) | EMAA1 (acid content 8% by mass) | 99.5 | 99 | 97 | 95 | | | | | | | | |
|  | EMIA2 (acid content 10% by mass) | | | | | 99.5 | 99 | 97 | 95 | | | | |
|  | EMAA3 (acid content 15% by mass) | | | | | | | | | 99.5 | 99 | 97 | 95 |
| Component (A) | CNT1 | 0.5 | 1 | 3 | 5 | 0.5 | 1 | 3 | 5 | 0.5 | 1 | 3 | 5 |
| Appearance of strands (dispersibility of component (A)) | | A | A | A | A | A | A | A | A | A | A | A | A |
| MFR (g/10 min) | | 18.2 | 14.1 | 3.7 | 0.25 | 28 | 21 | 6.1 | 0.5 | 19.7 | 15.2 | 4.2 | 0.3 |
| Volume resistivity (Ω · cm) | | 3.0E+07 | 4.3E+02 | 8.0E+00 | 1.9E+00 | 7.2E+05 | 4.6E+02 | 5.4E+00 | 1.5E+00 | 5.0E+02 | 3.0E+01 | 3.2E+00 | 1.0E+00 |

TABLE 2

|  |  | Example 13 | Example 14 | Example 15 | Example 15 | Comparative Example 1 | Comparative Example 2 |
|---|---|---|---|---|---|---|---|
| Component (B) | Ionomer 1 | 99.5 | 99 | 97 | 95 | | |
| Resin for comparison | PE1 | | | | | 99.5 | 9.9 |
|  | PP1 | | | | | | |
| Component (A) | CNT1 | 0.5 | 1 | 3 | 5 | 0.5 | 1 |
| Appearance of strands (dispersibility of component (A)) | | A | A | A | A | A | B |
| MFR (g/10 min) | | 12.5 | 10 | 2.5 | 0.15 | 10.2 | 8 |
| Volume resistivity (Ω · cm) | | 6.6E+08 | 3.0E+02 | 1.1E+01 | 2.6E+00 | >1.0E+14 | 1.0E+07 |

TABLE 2-continued

|  |  | Comparative Example 3 | Comparative Example 4 | Comparative Example 5 | Comparative Example 6 | Comparative Example 7 | Comparative Example 8 |
|---|---|---|---|---|---|---|---|
| Component (B) | Ionomer 1 |  |  |  |  |  |  |
| Resin for comparison | PE1 | 97 | 95 |  |  |  |  |
|  | PP1 |  |  | 99.5 | 99 | 97 | 95 |
| Component (A) | CNT1 | 3 | 5 | 0.5 | 1 | 3 | 5 |
| Appearance of strands (dispersibility of component (A)) |  | B | C | A | A | B | B |
| MFR (g/10 min) |  | 2.1 | 0.12 | 2.3 | 1.8 | 0.6 | 0.04 |
| Volume resistivity (Ω·cm) |  | 6.2E+01 | 6.9E+00 | 1.1E+09 | 3.3E+03 | 1.3E+01 | 2.6E+00 |

In Table 1 and Table 2, numerical values shown in the fields of the respective components indicate the contents (% by mass) of the respective components in the resin compositions.

Blanks in Table 1 and Table 2 indicate that the corresponding components are not contained.

In Table 1 and Table 2, the description "3.00E+07" and the like indicate $3.00 \times 10^7$ and the like.

It can be seen from Table 1 and Table 2 that, in Examples 1 to 16 in each of which the resin composition containing component (A) (namely, the carbon nanotubes (A)) and the component (B) (namely, the resin (B) which is at least one selected from the group consisting of: an ionomer of an ethylene-unsaturated carboxylic acid copolymer (B1); and an ethylene-unsaturated carboxylic acid copolymer (B2)) was used, the appearance of the strands (namely, the dispersibility of the component (A)) was excellent, and the volume resistivity was reduced.

In contrast, in Comparative Examples 1 to 8 in each of which the resin for comparison was used instead of the component (B), the appearance of the strands (namely, the dispersibility of the component (A)) was deteriorated, and a tendency for an increase in the volume resistivity was observed.

Specifically, it can be seen from the results of Comparative Examples 1 to 8 that, in a case in which the resin for comparison was used instead of the component (B), the appearance of the strands (namely, the dispersibility of the component (A)) is deteriorated as the content of the component (A) is increased.

Further, upon comparison of the Examples and Comparative Examples in which the contents of the component (A) are the same, it can be seen that the volume resistivity tends to be higher in Comparative Examples as compared to Examples. For example, a volume resistivity of $1 \times 10^3$ Ω·cm or less has been achieved in each of Example 2, Example 6, Example 10 and Example 14 in which the content of the component (A) is 1% by mass; whereas a volume resistivity of $1 \times 10^3$ Ω·cm or less has not been been achieved in each of Comparative Examples 2 and 6 in which the content of the component (A) is 1% by mass.

The disclosure of Japanese Patent Application No. 2019-013411, filed on Jan. 29, 2019, is incorporated herein by reference in their entirety. All publications, patent applications, and technical standards mentioned in the present specification are incorporated herein by reference to the same extent as if such individual publication, patent application, or technical standard was specifically and individually indicated to be incorporated by reference.

The invention claimed is:

1. A resin composition, consisting of:
   carbon nanotubes (A); and
   a resin (B), which is an ethylene-unsaturated carboxylic acid copolymer (B2) in which none of the carboxy groups in the ethylene-unsaturated carboxylic acid copolymer (B2) is neutralized with any metal ions,
   wherein the carbon nanotubes (A) have an average diameter of from 5 nm to 20 nm, and an average length of from 0.5 µm to 50 µm, and
   a content of the resin (B) is from 95% by mass to 99.9% by mass, with respect to the total amount of the resin composition.

2. The resin composition according to claim 1, wherein:
   a content of an unsaturated carboxylic acid unit in the ethylene-unsaturated carboxylic acid copolymer (B2) is from 1% by mass to 25% by mass, with respect to a total amount of the ethylene-unsaturated carboxylic acid copolymer (B2).

3. The resin composition according to claim 1, wherein:
   a content of an ethylene unit in the ethylene-unsaturated carboxylic acid copolymer (B2) is from 75% by mass to 99% by mass, with respect to a total amount of the ethylene-unsaturated carboxylic acid copolymer (B2).

4. The resin composition according to claim 1, wherein the resin (B) has a melt flow rate, as measured under conditions of a temperature of 190° C. and a load of 2,160 g, in accordance with JIS K7210-1:2014 (ISO 1133-1:2011), of from 0.1 g/10 min to 300 g/10 min.

5. A molded product, comprising the resin composition according to claim 1.

* * * * *